UNITED STATES PATENT OFFICE.

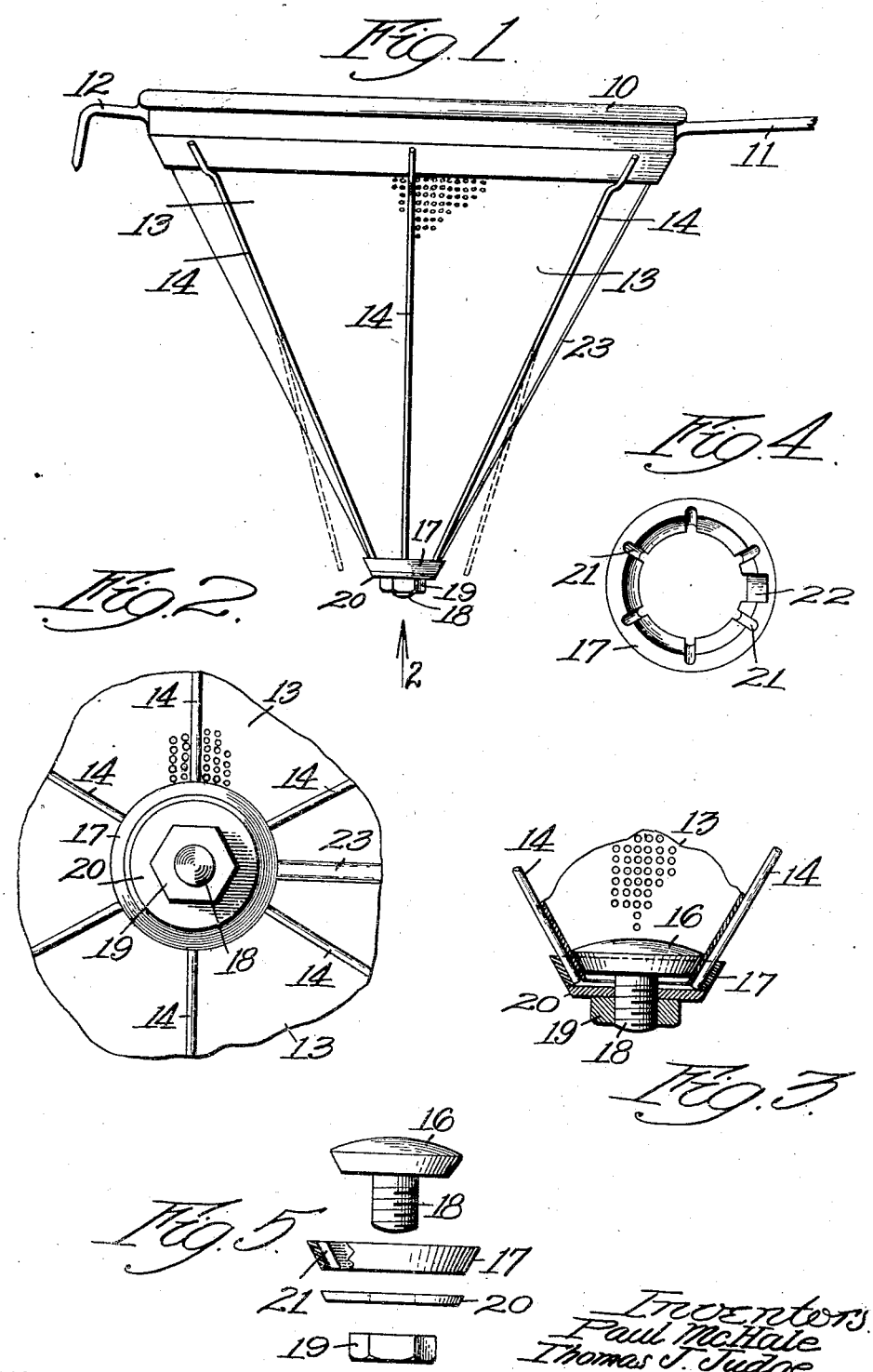

PAUL McHALE AND THOMAS J. JUDGE, OF WORCESTER, MASSACHUSETTS.

CULINARY STRAINER.

1,246,291.　　　　Specification of Letters Patent.　　Patented Nov. 13, 1917.

Application filed September 10, 1917. Serial No. 190,437.

*To all whom it may concern:*

Be it known that we, PAUL McHALE and THOMAS J. JUDGE, citizens of the United States, residing at Worcester, in the county of Worcester and State of Massachusetts, have invented a new and useful Culinary Strainer, of which the following is a specification.

This invention relates to a culinary strainer of the type known as the "china cap," and the principal object thereof is to provide a solderless and non-meltable means for connecting a series of supporting and strengthening wires with the bottom of a conical foraminous strainer of this type, and also to provide improvements in details of construction for securely holding the said wires and preventing the lodgment of grease or other material being strained in the bottom of the strainer. Further objects and advantages of the invention will appear hereinafter.

Reference is to be had to the accompanying drawings, in which—

Figure 1 is a side elevation of a china cap provided with a preferred embodiment of this invention;

Fig. 2 is a bottom plan view of the same as indicated by the line 2 of Fig. 1 on enlarged scale;

Fig. 3 is a central sectional view of the same;

Fig. 4 is a top plan of the holding collar, and

Fig. 5 is a side elevation of the several elements of the holding mechanism shown separated and partly in section.

These china caps are used for several purposes, but particularly for straining melted grease. This grease attains a very high temperature in practice especially where large quantities of it are melted, as in restaurants, hotels and the like. When strained through the ordinary conical cap or kitchen strainer it is obvious that the apex of the cone is embedded for a considerable period of time in a moving stream of this hot grease. We find that if the strainer is strengthened by external wires soldered over the apex of the strainer on the outside the solder is frequently melted by the hot grease and the wires spring apart as indicated in dotted lines in Fig. 1. It is desirable to protect the apex of the cone for the reason that it ordinarily extends to a sharp point and projects from the handle at a considerable distance so that it is likely to be jammed and spoiled if not fully protected.

This invention is designed to obviate all these difficulties and also to provide a device in which the fastening means will not interfere with the draining of the entire quantity of grease from the strainer. This is a feature of some importance also because if the outside of the apex of the cone is covered with solder to hold the wires it forms a solid cup which will hold the grease back and not let the liquid pass or drain out at that point.

Referring to the drawings, the invention is shown as applied to a strainer of this type having a rim 10, handle 11, and supporting hook 12 in one piece of cast metal. On the inside this rim is provided with a foraminous strainer 13 in the form of a cone soldered or otherwise secured to the interior of the rim as usual. A series of strengthening wires extending along the sides of the cone in the direction of the elements thereof are shown at 14. These preferably are soldered to the outside of the rim and also to the outside of the strainer at the top, but are free from the strainer below.

This invention is designed particularly for holding the wires in position as stated, and for that purpose the cone instead of being completed is truncated or cut off near its apex and a head 16 is placed inside. This head is of conical shape at its edge to fit the inside of the cone so that it will not under any circumstances pass through the hole at the bottom and its top surface is convex to cause the entire contents to drain off into contact with the strainer surface. This head performs several functions. It takes care of the drainage as stated, it closes the bottom of the strainer, and it also acts as a solid abutment inside to hold the strainer to a true conical form at the bottom and to receive the pressure from a holding collar 17 outside.

This holding collar may be fixed with respect to the head in any desired way, but we have shown the head as provided with an integral screw 18 and a nut 19 and washer 20 for holding the parts in position. This collar 17 is of a conical shape inside and outside and is provided with notches 21 for receiving the ends of the wires 14, and is also shown as provided with a notch 22 for receiving the projecting seam 23 of the strainer where the edges are soldered together. It will be obvious that by screwing the nut up and holding the parts firmly together in that way not only are the wires 14 held absolutely in position so that there is no possibility of their being accidentally dislodged, but the bottom of the strainer is also held in fixed position and maintained in its correct shape. The holding collar is bottomless, the bottom being supplied by the washer 20. The outside of this has a conical edge surface continuous with the external conical surface of the collar, but the head 16 forms the bottom of the strainer and no material can come down through without passing through the strainer and out over the top of the edge of the collar.

In this way a strainer is secured which will discharge all its liquid contents readily and without unusual manipulation on the part of the operator. The strainer is held to a firm shape, and is made stronger than heretofore at the apex of the cone and the strengthening wires are held in position without the use of any solder or other composition that might yield and render the device useless. At the same time the parts can be dismounted so that the strainer can be thoroughly cleaned at the point where it is likely to gather solid particles and at the point that has never been capable of being thoroughly cleaned in the usual conical strainers.

Although we have illustrated and described only a single form of the invention, we are aware of the fact that modifications can be made therein by any person skilled in the art without departing from the scope of the invention as expressed in the claims. Therefore we do not wish to be limited to all the details of construction herein shown and described, but what we do claim is—

1. As an article of manufacture, a kitchen strainer comprising a rim and handle, a foraminous strainer in conical form depending from said rim, strengthening wires secured to the rim and top of the strainer and extending to the bottom thereof, the strainer being cut away at the apex, and means extending inside the strainer for holding the ends of said wires.

2. As an article of manufacture, a foraminous conical strainer provided with strengthening wires secured to the top thereof and extending to the bottom, the strainer being cut away at the apex, and a fastening device for securing the free ends of the wires at the small end of the strainer, said fastening device having a head located inside and forming a solid base for clamping against and holding the strainer in its proper form.

3. As an article of manufacture, a foraminous conical strainer provided with strengthening wires secured to the top thereof and extending to the bottom, the strainer being cut away at the apex, and a fastening device for securing the free ends of the wires at the small end of the strainer, said fastening device having a head extending inside and forming a solid base for clamping against and comprising an external collar having an inner conical surface for engaging the outside of the strainer and holding the wires.

4. As an article of manufacture, a foraminous conical strainer provided with strengthening wires secured to the top thereof and extending to the bottom, the strainer being cut away at the apex, and a fastening device for securing the free ends of the wires at the small end of the strainer, said fastening device having a head portion extending inside and forming a solid base for clamping against and holding the strainer in its proper form, an external collar having an inner conical surface for engaging the outside of the strainer and holding the wires, and having grooves on its inner surface for receiving the ends of the wires, and an external conical surface, a washer closing the bottom of said collar, and fastening means outside said washer connected with the inside base portion.

5. As an article of manufacture, a foraminous conical strainer provided with strengthening wires secured to the top thereof and extending to the bottom, the strainer being cut away at the apex, and a fastening device for securing the free ends of the wires at the small end of the strainer, said fastening device having a portion extending inside and forming means for holding the strainer in its proper form at the end, the part inside the strainer comprising a convex head adapted to cause all liquid contents of the strainer to be discharged through the strainer walls, and means for fastening it in position.

6. As an article of manufacture, a foraminous conical strainer cut away at the apex, and a fastening device having a portion extending inside and forming means for holding the strainer in its proper form at the end, the part inside the strainer comprising a convex head adapted to cause all liquid contents of the strainer to be discharged through the strainer walls, and means outside the strainer for fastening it in position.

7. As an article of manufacture, a foraminous conical strainer cut away at the apex having a solid base for clamping against and holding the strainer in its proper form, an external collar having an inner conical surface for engaging the outside of the strainer, and an external conical surface, a washer closing the bottom of said collar, and fastening means outside said washer connected with the inside base.

In testimony whereof we have hereunto affixed our signatures.

PAUL McHALE.
THOMAS J. JUDGE.